Figure 7:
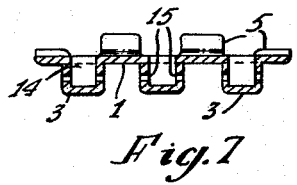

March 30, 1965    R. GRAY    3,175,930
LEAD-ACID ELECTRIC ACCUMULATORS
Filed Nov. 8, 1961    2 Sheets-Sheet 1
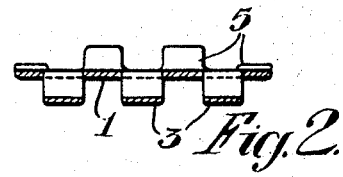
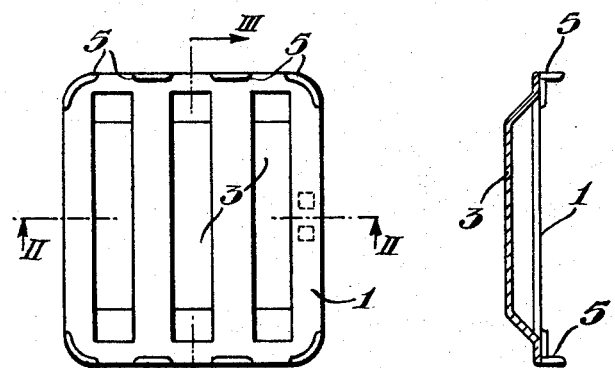
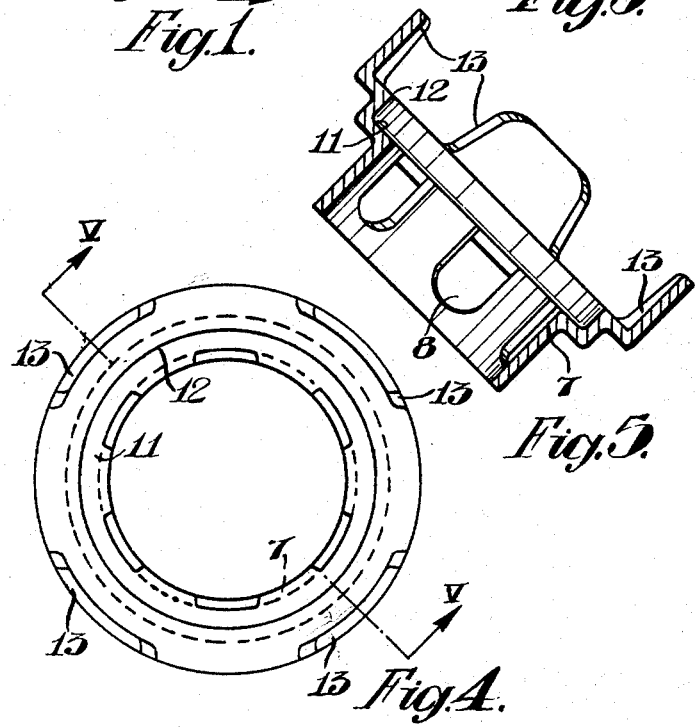

March 30, 1965  R. GRAY  3,175,930
LEAD-ACID ELECTRIC ACCUMULATORS
Filed Nov. 8, 1961  2 Sheets-Sheet 2

_____

United States Patent Office 3,175,930
Patented Mar. 30, 1965
_____

3,175,930
LEAD-ACID ELECTRIC ACCUMULATORS
Robin Gray, Heaton Moor, Stockport, England, assignor to Chloride Batteries Limited, Swinton, England, a British company
Filed Nov. 8, 1961, Ser. No. 151,009
7 Claims. (Cl. 136—182)

This invention relates to lead-acid electric accumulators or wet batteries and is concerned with the provision of means which allow the level of the electrolyte in the cells to be kept under observation over an increased range of levels than is at present possible so that a longer interval can transpire before the cells require to be topped up.

In certain types of battery, such as those used for vehicle propulsion a guard device is usually provided below the filling orifice and vent plug to protect the top edges of the separators, where they project above the plates, from damage by any instrument or device inserted through the filling orifice for topping up or for testing the electrolyte density or temperature. Such guard device can serve also as a spray arrester to deflect or break-up gas bubbles from the area beneath the vent plug. Such known devices enable observations to be made to a minimum level which is a little above the top edges of the separators which they protect and which therefore is likely to be appreciably above the top edges of the plates.

Accordingly, it is an object of the present invention to provide an electric accumulator of the type that includes the casing within which is an electrolyte, a plurality of parallel plates of predetermined height and intermediate separators of greater height, and a guard device comprising vertical spaced series of laterally spaced strips constructed and arranged so that the strips of the respective series are spaced a vertical distance not exceeding the difference in height between the upper edges of the separators and the upper edges of the plates, with the strips of the lower series being intermediate the strips of the upper series so that when the upper strips rest on the separators, the lower strips are in a position therebetween to indicate the lower level of electrolyte.

It is a further object of the invention to provide in an electric accumulator, a tubular component serving to indicate the upper limit of electrolyte and in which the guard device includes means cooperating with the lower end of this tubular component to restrict movement of this guard device within the casing. Further, this tubular component is affiliated with a filling orifice to provide by its cooperation with the guard device that the latter is always beneath the filling orifice.

It is a further specific object to provide said tubular component with an interrupted ledge so as to make it more conspicuous and function to indicate the level of electrolyte within the casing.

Figure 8:
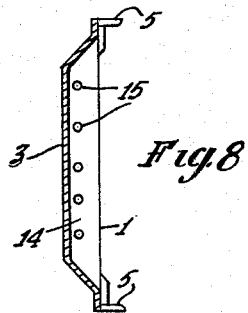
Figure 6:
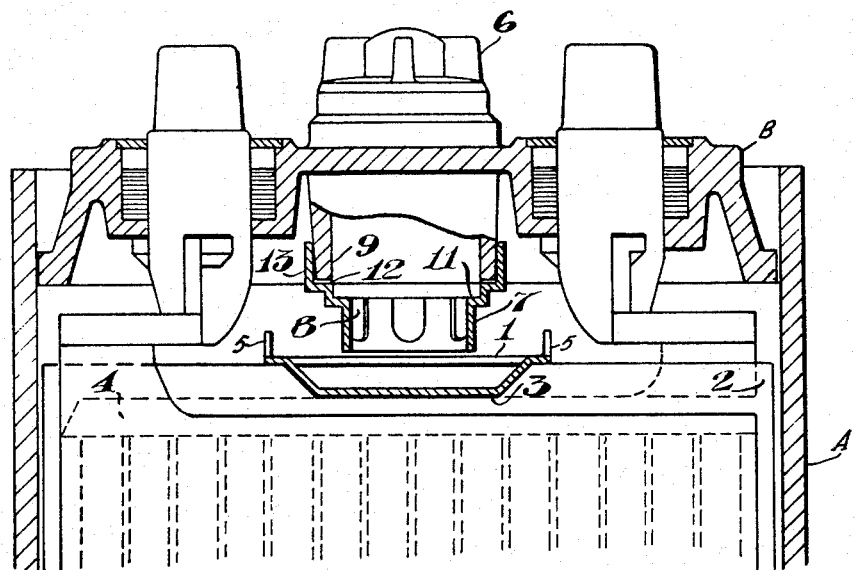

Further and more specific objects will be apparent from the following description taken in connection with the accompanying drawing in which:

FIGURE 1 is a plan view of a guard device according to the invention.
FIGURE 2 is a section on the line II—II of FIGURE 1.
FIGURE 3 is a section on the line III—III of FIGURE 1.
FIGURE 4 is a plan view of a device for indicating the upper limit of electrolyte level.
FIGURE 5 is a section on the line V—V of FIGURE 4.
FIGURE 6 shows devices according to the invention in position in an accumulator, and
FIGURES 7 and 8 are views respectively similar to FIGURES 2 and 3 but illustrating a modified form of guard device.

In accordance with the invention as shown in the drawing, the guard device, which may be made of polystyrene or other suitable material, is disposed within the casing A of the accumulator as shown in FIG. 6. Within the casing is a plurality of parallel plates 4 of predetermined height and intermediate separators 2 of a greater height. The guard device includes a frame or base provided by a first plurality of coplanar, spaced, parallel strips 1, the space between adjacent strips not exceeding the distance between adjacent separators 2. The guard device further includes a second plurality of coplanar, spaced parallel strips 3 lying in a plane parallel to and below strips 1 a distance not exceeding the difference in height between the upper edges of the plates and separators. Each of these strips 3 is between a pair of strips 1, see FIG. 2. With this arrangement, when the strips 1 rest on the tops of the separators, the strips 2 are positioned between adjacent separators so as to indicate the lower level of the electrolyte. The spacing between the upper surface of strips 3 and the under surface of strips 1 can be at such intermediate height or at such intermediate distance between the tops of the plates and separators as may be preferred so long as the upper surface of strips 3 are at a lower level than the tops of the separators. As shown in FIG. 6, the under surface of strips 3 are approximately at the level of the top of plates 4. The guard device further includes parts or lugs 5 which serve to restrict movement thereof within the casing as explained hereinafter so that it is always below the filling orifice and vent plug 6 associated with the closure B of the accumulator.

With the arrangement of FIGS. 2 and 3 the separators in effect constitute side walls with respect to the gaps or space between the upper and lower strips. However, as shown in FIGS. 7 and 8 the guard device may be provided with side walls 14 which extend downwards from the strips 1 to the strips 3. When these side walls are included they are provided with openings 15 therein to permit circulation of electrolyte between the liquid that is below and above the lowermost strips 3.

It will be appreciated that with my improved guard the level at which the electrolyte is standing can be observed and samples of electrolyte can be withdrawn from between the separators down to a level only slightly above the tops of the plates 4, whilst the top edges of the separators 2 are protected against damage from above, and gas bubbles rising through the guard are deflected as desired.

The lower strips of the guard as described, when made with side walls form trough-shaped walls extending downwards below the top edges of the separators. Wells of other shapes such as for instance circular or oval might alternatively be provided which extend below the top edges of the separators.

The guard devices may be fitted onto and between separators before the cell closure is placed in position.

For indicating the upper limit of electrolyte, my accumulator includes an additional component associated with the guard device and which also serves to improve the efficiency of the guard device in its function as a separator guard and as a separator or baffle that prevents acid spray from reaching the filling orifice of the accumulator. As shown in FIG. 6, the accumulator includes a closure B having associated therewith a depending tubular element 9 which defines a filling and inspection opening. Vent plug 6 cooperates with the tubular elements as is conventional. The means that indicate the upper level of electrolyte comprises another tubular element 7, shown in detail in FIGS. 4 and 5. This tubular element is in effect a perforated component that forms an extension of and located on the underside of top tubular element 9. This second-mentioned tubular element is provided with a first ledge 11 which is interrupted to form perforations 8 and which interruption make this ledge more conspicuous so that on visual inspection, the upper level of the electrolyte will be indicated. The tubular element further includes another internal ledge 12 spaced laterally of ledge 11 which fits under tubular element 9. Tongues 13 extend upwardly of ledge 12 to fit around the exterior of top element 9 so as to hold the tubular element 7 in position. If desired, a single ledge can be provided that is interrupted but which has upwardly extending tongues to provide a fit with tubular element 9. As shown in FIG. 6 the depending, extending tubular element 7 is such that its lower end lies beneath the upper level of upper ends of the lug projections 5 so as to cooperate therewith in restricting movement of the guard device within the casing and insure that the latter is always positioned below the filling opening.

Further, the tubular extension of the components 9 and 7 are such as to prevent instruments from being inserted within the casing at such a wide angle as to cause damage to the edges of the separators constituting the sides of the troughs in the preferred form of my improved separator guard. It also prevents inserted instruments from being extended laterally beyond the projected circumference of the filling orifice, thereby allowing the use of a common separator guard of limited dimensions in a large variety of cell sizes with economy in the number of parts required to cover an extensive range of cell sizes. The tubular extension may serve also as a convenient means of preventing the separator guard from floating upwards in the electrolyte.

It will be appreciated that my improvement is of great value in cells where the plates of at least one pole are relatively thick, as, for instance, in lead-acid cells with tubular positive plates, such as are widely used for battery-driven vehicles. Such plates will accommodate between their adjacent separators a well or depression wide enough to accept the nozzles of standard hydrometer syringes. The width of the depressions in the guard is at its maximum when the two adjacent separators constitute the side walls of the depression. Where the plates are of substantial thickness, there is the advantage that specific gravity readings can be taken conveniently even when the electrolyte level has fallen well below the level of separator guards such as hitherto used. The latter provided visual observation of the electrolyte level only down to a level which was just above the top edges of the separators which they protect and resulted in the cells being topped up sooner and hence more frequently than was actually necessary.

What I claim is:

1. In an electric accumulator of the type including a casing, within the casing an electrolyte, a plurality of parallel plates of a predetermined height and intermediate separators of greater height, a guard device comprising a base including a first plurality of coplanar, spaced, parallel strips, the space between adjacent ones of these strips not exceeding the distance between adjacent separators, and a second plurality of coplanar, spaced, parallel strips lying in a plane parallel to and below the first strips a distance not exceeding the difference in height between the plates and separators with the strips of the second plurality being intermediate the strips of the first plurality of strips and the strips of the second plurality of strips having a width not exceeding the distance between adjacent separators whereby when the first-mentioned plurality of strips rest on the separators, the strips of the second plurality of strips are positioned therebetween to indicate the lower level of the electrolyte.

2. In an electric accumulator as claimed in claim 1, and said guard device including walls extending downwards from the upper strips to the lower strips and said walls having openings therein to permit circulation of electrolyte.

3. In an electric accumulator as claimed in claim 1 and a closure means for the casing having an orifice therein, said guard device including lugs extending above said first plurality of strips for restricting movement of the guard device within the casing.

4. In an accumulator as claimed in claim 1, and a top wall for the casing having a depending tubular element defining a filling and inspection opening and means for indicating the upper limit of an electrolyte within the casing comprising another tubular element above the guard device, fitting under said first-mentioned tubular element and including a portion which indicates the maximum electrolyte level.

5. In an electric accumulator as claimed in claim 4 in which said portion of the second-mentioned tubular element comprises an internal ledge formed on said second tubular element, said ledge being interrupted to make it more conspicuous and being located on said second tubular element so as to lie at the position of the recommended maximum of the electrolyte level.

6. In an electric accumulator as claimed in claim 5 and said second-mentioned tubular element including another internal ledge disposed to underlie said first-mentioned tubular element and tongues extending upwardly from said second-mentioned internal ledge adapted to fit around the exterior of the first-mentioned tubular element.

7. In an electric accumulator as claimed in claim 6 and said second-mentioned tubular element having a depending extent such that its lower end terminates at a level within the casing beneath the upper ends of the lugs on the guard device so as to cooperate therewith in locating the guard device beneath the filling opening.

References Cited by the Examiner

UNITED STATES PATENTS

| | | | |
|---|---|---|---|
| 1,111,451 | 9/14 | Ford. | |
| 2,643,279 | 6/53 | Bradley | 136—177 |
| 2,926,211 | 2/60 | Sturges | 136—177 |

FOREIGN PATENTS 169,541 10/21 Great Britain.

JOHN H. MACK, *Primary Examiner.*

JOHN R. SPECK, *Examiner.*